(12) United States Patent
Oliveira et al.

(10) Patent No.: US 12,316,528 B1
(45) Date of Patent: May 27, 2025

(54) TRANSPORTATION HANDOFFS FOR INCREASED NETWORK DENSITY

(71) Applicant: Amazon Technologies, Inc., Seattle, WA (US)

(72) Inventors: Ivan Borges Oliveira, Bellevue, WA (US); Golbarg Kazemi Tutunchi, Bellevue, WA (US); Quico Pepjin Spaen, Menlo Park, CA (US); Timothy Lee Jacobs, Seattle, WA (US); Vighnesh Naik, Redmond, WA (US); Akhand Pratap Singh, Seattle, WA (US); Suresh Rangaswamy, Seattle, WA (US); Sendhil Nathan, Austin, TX (US); Ian Ward, Seattle, WA (US); Manik Kumar, Woodinville, WA (US); Georgios Patsakis, Sunnyvale, CA (US)

(73) Assignee: Amazon Technologies, Inc., Seattle, WA (US)

( * ) Notice: Subject to any disclaimer, the term of this patent is extended or adjusted under 35 U.S.C. 154(b) by 377 days.

(21) Appl. No.: 17/852,880

(22) Filed: Jun. 29, 2022

(51) Int. Cl.
*H04L 47/125* (2022.01)
*H04L 45/12* (2022.01)
*H04L 45/125* (2022.01)
*H04L 47/122* (2022.01)

(52) U.S. Cl.
CPC .......... *H04L 45/125* (2013.01); *H04L 45/123* (2013.01); *H04L 47/122* (2013.01); *H04L 47/125* (2013.01)

(58) Field of Classification Search
CPC ... H04L 47/125; H04L 45/123; H04L 45/125; H04L 47/122
See application file for complete search history.

(56) References Cited

U.S. PATENT DOCUMENTS

| | | | |
|---|---|---|---|
| 10,242,333 B1 * | 3/2019 | Colucci, III | G06K 19/06028 |
| 11,808,589 B1 * | 11/2023 | Dong | G06Q 10/08355 |
| 11,948,109 B1 * | 4/2024 | Kriett | G06Q 10/06312 |
| 2016/0300186 A1 * | 10/2016 | Scharaswak | G06Q 10/0835 |
| 2021/0287262 A1 * | 9/2021 | Abbott | G06Q 30/0282 |

* cited by examiner

*Primary Examiner* — Andrea C Leggett
(74) *Attorney, Agent, or Firm* — Kilpatrick Townsend & Stockton LLP

(57) ABSTRACT

Transportation handoffs for increased network density are described herein. In an example, a computer system generates first data indicating a first candidate network path associated with transporting a first load of items between an origin and a destination within a network. The first candidate network path directly connects the origin and the destination. The computer system generates second data indicating a second candidate network path indirectly connecting the origin and the destination. The computer system generates a first input including the first data and the second data to an optimization model and a second input about a second load of items to the optimization model. The computer system determines an output of the optimization model indicating, for the first load, a selected network path a resource assignment per segment of the selected network path. The computer system causes, based on the output of the optimization model, utilization of transportation resources.

20 Claims, 9 Drawing Sheets

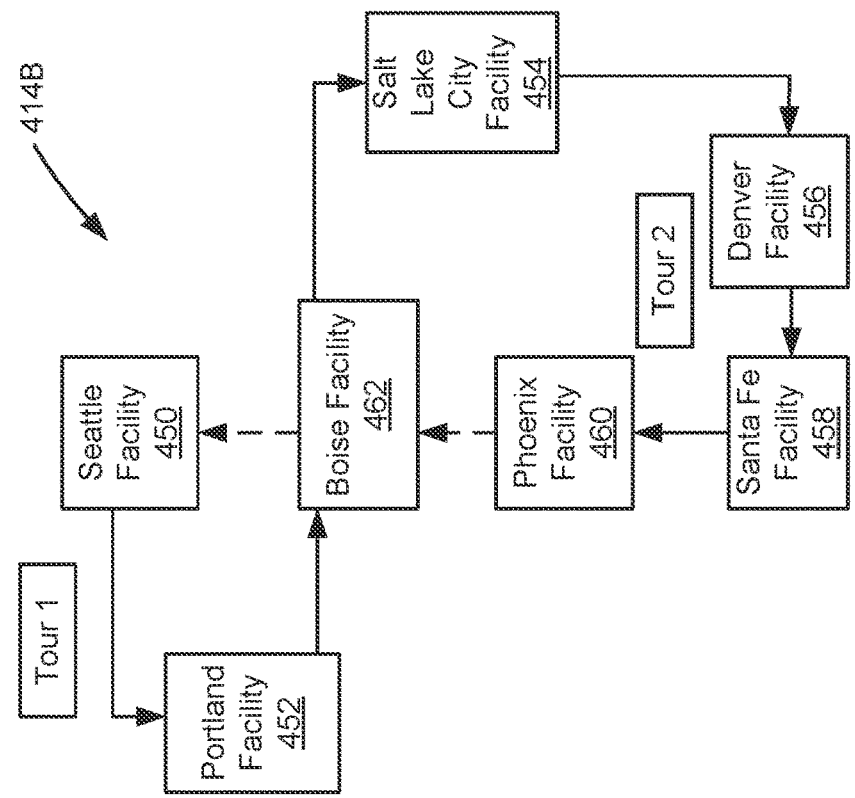
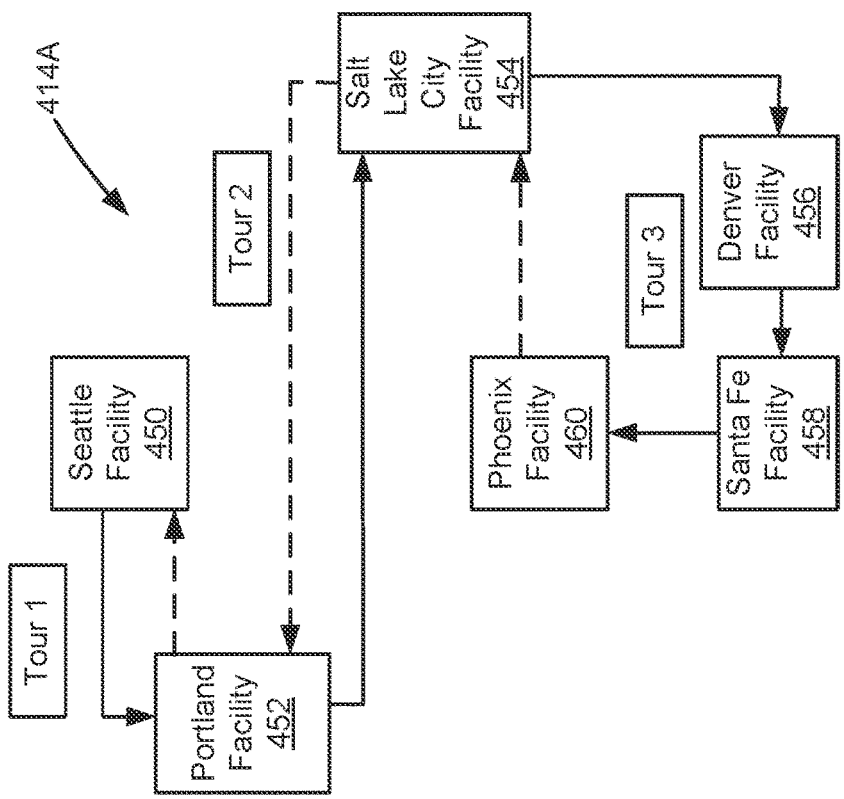
FIG. 4

TRANSPORTATION HANDOFFS FOR INCREASED NETWORK DENSITY

BACKGROUND

An operator may manage a network of physical resources to provide an online service. For example, a network of delivery vehicles can be operated to transport items between locations in response to one or more online requests for the items. The network may be dynamic, whereby the number and type of physical resources can change over time depending on a number of factors. Network underutilization or overutilization may occur when such physical resources are not optimally used or allocated.

BRIEF DESCRIPTION OF THE DRAWINGS

Various embodiments in accordance with the present disclosure will be described with reference to the drawings, in which:

FIG. 4 illustrates example route plans generated with and without an optimization model according to some embodiments;

DETAILED DESCRIPTION

Figure 1:
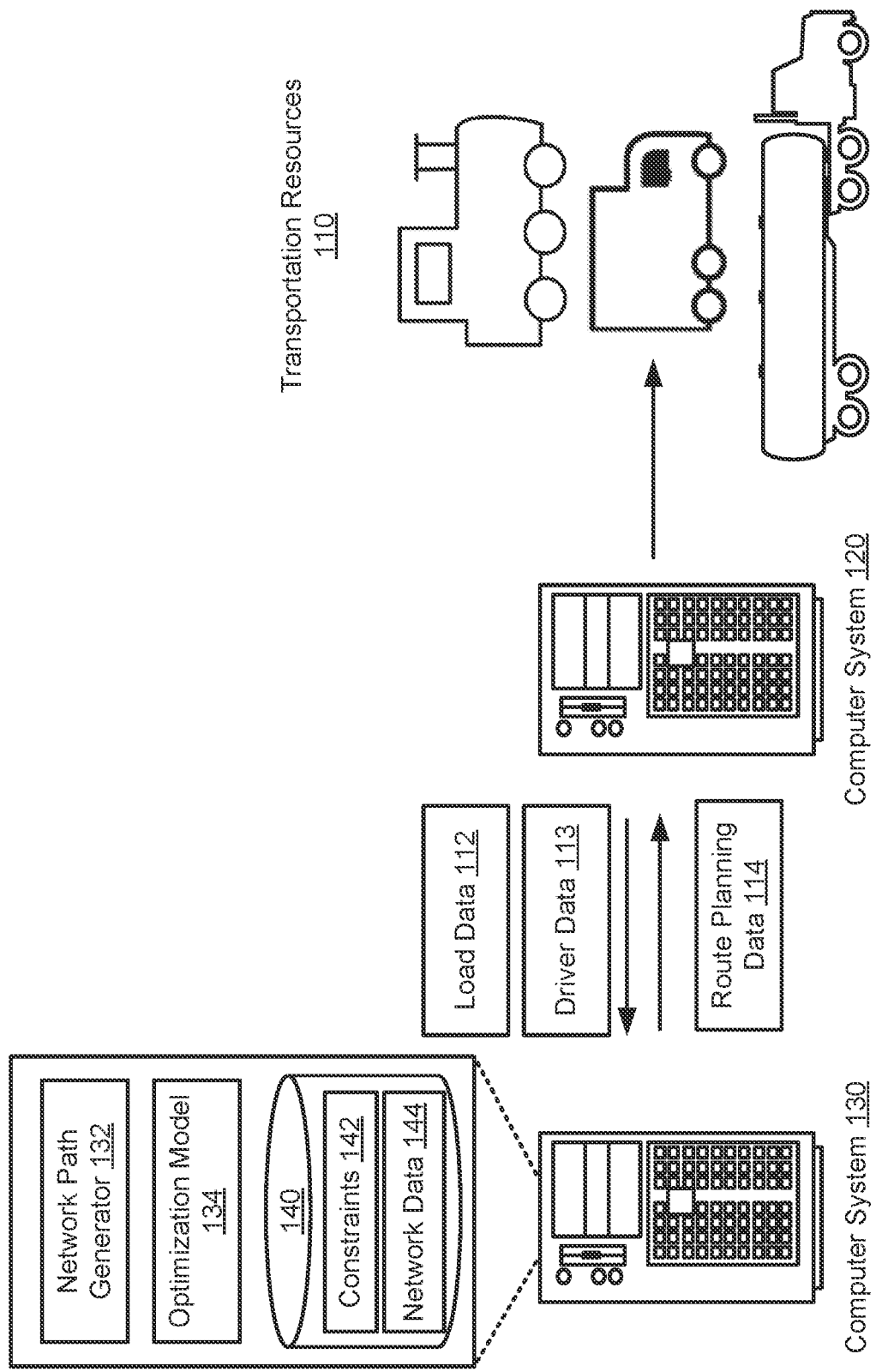
FIG. 1 illustrates an example of an overall context of determining transportation handoffs for increased network density according to some embodiments.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Embodiments of the present disclosure are directed to, among other things, determining transportation handoffs for increased network density of a transportation network. The transportation network includes physical resources such as facilities, segments that connect the facilities, and transportation resources (e.g., vehicles) that transport items between the facilities by traveling along the segments. A computer system associated with determining transportation handoffs can generate first data associated with transporting a first load of items between an origin and a destination within the network. The first data can indicate a first candidate network path within the network that directly connects the origin and the destination. The computer system can also generate second data associated with the transporting, where the second data indicates a second candidate network path within the network that indirectly connects the origin and the destination. The second candidate network path, and additional candidate network paths connecting the origin to the destination, may be generated according to constraints (e.g., a minimum or maximum duration per segment of a candidate network path, a maximum number of segments of a candidate network path, allowed operation times of the load facilities, a maximum distance deviation from the origin and/or the destination, etc.). The computer system generates a first input including the first data and the second data to an optimization model. The computer system also generates candidate network paths for other loads for transporting the other loads within the network. For example, the computer system can generate a second input about candidate network paths for a second load of items (and, similarly, about multiple other loads) to the optimization model. The computer system determines an output of the optimization model that indicates, for the first load, a selected network path from the first candidate network path and the second candidate network path and a resource assignment per segment of the selected network path. A resource assignment to a segment corresponds to allocating a transportation resource to transport the first load along the segment. The resource assignment can change between segments, where a handoff of the first load can occur at a facility where one segment ends and another segment starts. The output of the optimization model can be generated based on an optimization for the different loads given the different candidate segments and the possibilities of changing the resource assignments to increase or maximize an optimization function. The computer system can then cause, based at least in part on the output of the optimization model, utilization of a plurality of transportation resources.

To illustrate, consider an example of a system determining how to transport various loads of items from various origins to various destinations. For instance, a load may be transported from a facility in New York City to a facility in Las Vegas. The system can generate candidate network paths connecting New York City to Las Vegas. A first candidate network path can directly connect New York City to Las Vegas, whereas other candidate network paths can indirectly connect New York City to Las Vegas via additional facilities in other cities. The candidate network paths may be generated according to one or more constraints. For instance, the candidate network paths may be constrained to include three or less intermediary facilities. So, a candidate network path may connect from New York City to Cincinnati, from Cincinnati to Oklahoma City, and from Oklahoma City to Las Vegas. Candidate network paths that are generated can be input to an optimization model, which selects a candidate network path for each load and assigns a transportation resource (e.g., train, plane, vehicle, maritime, etc.) to each segment of the selected candidate network path. Different segments may be assigned different types of transportation resources. For instance, a load being transported from the United Kingdom to France may include segments assigned to trains and ships. The optimization model aims to build optimal driver tours, in which a driver starts and ends at a same location of the network by assigning loads and transportation resources to drivers. It is not known a priori which candidate network path provides the optimal segments to accomplish optimal tours. So, the optimization model can select the candidate network paths and the transportation resources that optimize a load-to-resource utilization time of the loads.

Embodiments of the present disclosure provide several technical advantages over conventional transportation handoff techniques. For instance, load transportation may be constrained by regulatory requirements (e.g., duty/driver time limits) and/or network topology (e.g., (node locations, direction of loads, etc.), which introduce inefficiencies, such as underutilization of transportation resources, or lack of capacity, such as overutilization of transportation resources. Conventional techniques often determine direct network paths and then determine resource assignments for the network paths, which often results in underutilization or overutilization of the resources. Other conventional techniques may artificially break each direct network path into multiple candidate network paths, each with shorter segments. But, breaking direct network paths the multiple candidate network paths results in computational complexity that renders resolving the optimization in a timely manner impossible (e.g., in time for deployment of resources). So, by providing a system that first generates candidate network paths that are subjected to certain constraints and then inputting the candidate network paths into an optimization model, and optimal solution can be resolved in a timely manner and that results in optimal utilization of resources, thereby increasing throughput of the network.

FIG. 1 illustrates an example of an overall context of determining transportation handoffs for increased network density. A computer system 130 can communicate another computer system 120. The computer system 130 is capable of supporting various computing services including, for instance, planning routes for transportation handoffs. In particular, the computer system 130 includes one or more processors, one or more memories storing computer-readable instructions for a route planning service, one or more network interfaces, and/or other computing components for communication with the computer system 120. The computer system 130 and the computer system 120 can include a set of devices (e.g., laptop, desktop, mobile device, etc.), a set of servers, and/or, more generally, a combination of computer hardware and program code that provides an online service to endpoints, or a distributed system that includes such combination and endpoints.

The computer system 120 can send load data 112 and driver data 113 to the computer system 130, which uses the load data 112 and the driver data 113 to generate resource planning data 114. The load data 112 indicates one or more loads of items that are to be transported between various origins and destinations. The origins and destinations can be load facilities of a network that are connected by segments. A load is transported between an origin load facility and a destination load facility by one or more transportation resources 110 (e.g., transportation vehicles such as trucks, vans, trains, planes, ships, etc.). The driver data 113 can indicate a number and location of internal drivers of the network.

In an example, the computer system 130 includes a network path generator 132 for generating candidate network paths between the origin load facility and the destination load facility for a load indicated in the load data 112. Candidate network paths can include one or more segments. A candidate network path with a single segment directly connects the origin load facility to the destination load facility, whereas a candidate network path with multiple segments indirectly connects the origin load facility to the destination load facility through a number of intermediary load facilities. The network path generator 132 can access a database 140 of constraints 142 and network data 144 to generate the candidate network paths. The constraints 142 may include one or more of a minimum or maximum duration per segment of a candidate network path, a maximum number of segments of a candidate network path, allowed operation times of the load facilities, a maximum distance deviation from the origin and/or the destination, and the like. The network data 144 can include indications of locations of the load facilities, segments that connect the load facilities, distances between the load facilities, transportation times between the facilities, etc. So, using the network data 144, the network path generator 132 can generate candidate network paths that satisfy the constraints 142. The network path generator 132 may generate "K" candidate network paths for each load.

The network path generator 132 can then generate an input of the candidate network paths to an optimization model 134. The input may include the "K" candidate network paths for each load, or may include a subset "K" candidate network paths of the "K" candidate network paths. For instance, the computer system 130 may rank the "K" candidate network paths based on a transportation time per candidate network path and then determine the subset "K" candidate network paths based on the ranking. If a subset is used, the input for a load may also indicate the single segment connection that directly connects the origin and destination. The output of the optimization model 134 can indicate a selected network path for each load. The output can also indicate a transportation resource of the transportation resources 110 that is assigned to each segment of the selected network path for each load. For example, the output can indicate that the selected network path includes a first segment that connects the origin load facility to an intermediary load facility that is assigned to a first truck and a second segment that connects the intermediary load facility to the destination load facility is assigned to a second truck. The intermediary load facility can be referred to as a handoff facility. In particular, the load is handed off from the first truck to the second truck at the handoff facility. In the case of trailer trucks, the load is a trailer load and the handoff is a trailer handoff, where no items of the load are repackaged or otherwise further processed. Instead, the trailer is unconnected from the first truck and thereafter connected to the second truck at the handoff facility. So, the handoff may just be temporary storage for the load. The optimization model 134 can determine the selected network path and the transportation resource assignment per segment for each load that increases a load-to-resource utilization time of the load (e.g., the ratio of the total time for transporting the load between the origin and destination over the actual time a set of resources are used to transport the load). The optimization model 134 can also maximize a utilization of the internal drivers indicated in the driver data 113.

The computer system 130 then generates the route planning data 114 based on the selected network path and the transportation resource assignment per segment for each load of the load data 112. That is, the route planning data 114 includes an indication of the selected network path and the transportation resources 110 that are assigned to the selected network path for each load. The computer system 130 sends the route planning data 114 to the computer system 120, which causes utilization of the assigned transportation resources 110. For instance, the computer system 120 can deploy the assigned transportation resources 110 with the loads.

Figure 2:
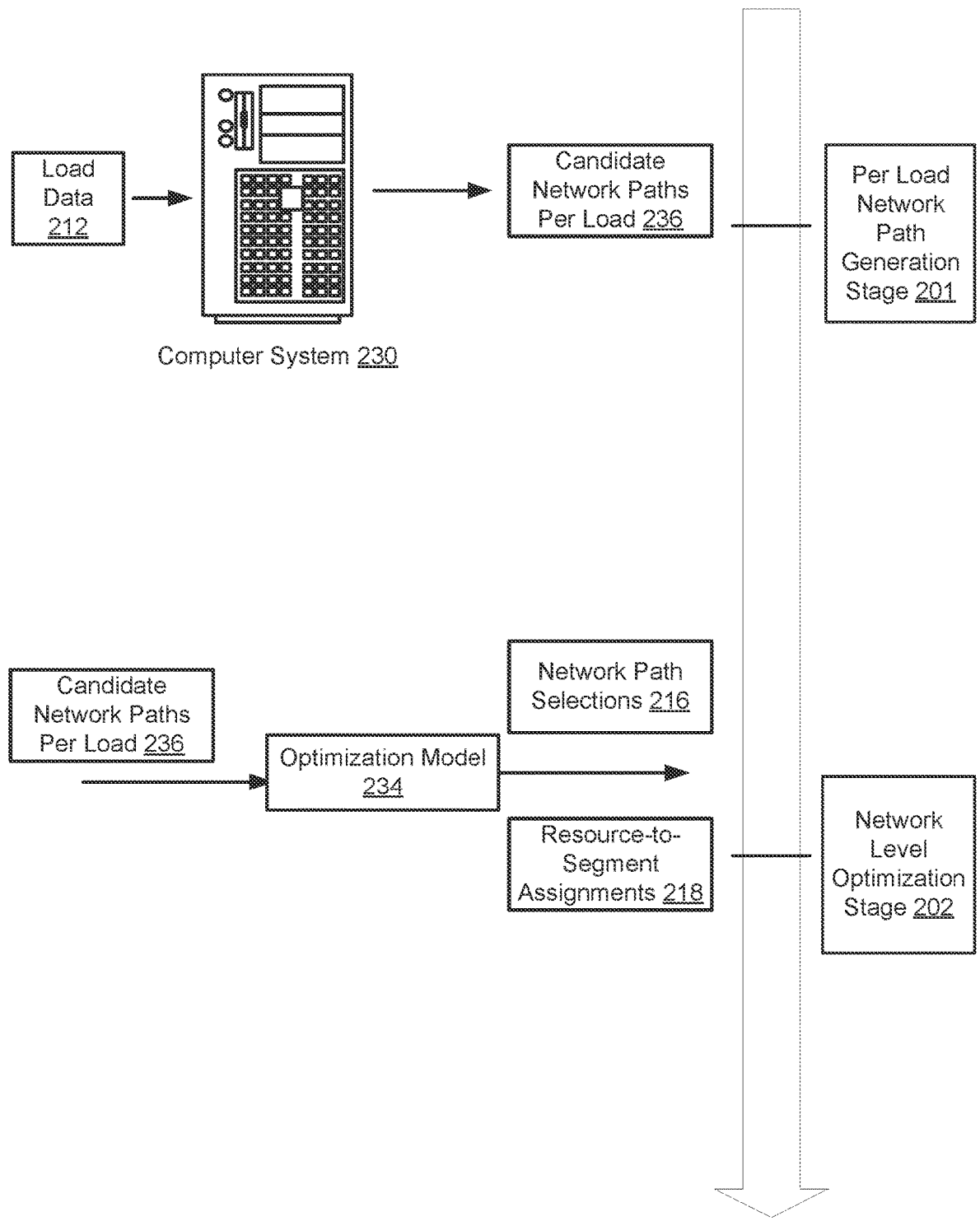
FIG. 2 illustrates an example of a flow diagram for determining transportation handoffs for increased network density according to some embodiments.

FIG. 2 illustrates an example of a flow diagram for determining transportation handoffs for increased network density. The flow diagram includes a per load network path generation stage 201 and a network level optimization stage 202.

In an example, the per load network path generation stage 201 involves a computer system 230 generating candidate network paths per load 236. The computer system 230 receives load data 212 indicating information about loads of items that are to be transported from an origin to a destination. The load data 212 can indicate the origin and destination for each load along with a start delivery time window of each load at the origin and an end delivery time window for the load at the destination. Upon receiving the load data 212, the computer system 230 generates the candidate network paths per load 236. Candidate network paths can include one or more segments. For instance, a first candidate network path can include one segment that directly connects the origin to the destination, and a second candidate network path can include a first segment that connects the origin to an intermediary facility and a second segment that connects the intermediary facility to the destination. The candidate network paths per load 236 can be generated based on a set of constraints (e.g., constraints 142 in FIG. 1). The constraints can be associated with the origin, the destination, a network path length, or a segment length. For instance, the constraints may include a maximum number of intermediary facilities, a maximum network path length in time or distance, a minimum or maximum segment length, a distance between an intermediary facility and the origin or the destination, and/or an operational time window associated with a segment. So, the computer system 230 determines the candidate network paths per load 236 that satisfy the constraints.

Once the candidate network paths per load 236 are generated, in the network level optimization stage 202, the candidate network paths per load 236 are input to an optimization model 234. The optimization model 234 can also receive driver data (e.g., driver data 113 in FIG. 1) as an input. The optimization model 234 can be implemented as executable program code of the computer system 230. The optimization model 234 determines, per possible solution of the optimization model 234, network path selections 216 and resource-to-segment assignments 218. The network path selections 216 indicate a network path per load and the resource-to-segment assignments 218 indicate transportation resources assigned to each segment of the network path. The optimization model 234 may resolve the network path selections 216 and the resource-to-segment assignments 218 jointly or sequentially. The optimization model 234 can also determine a load-to-resource utilization time per transportation resource. An optimal solution is then determined from the possible solutions of the optimization model 234 based on the load-to-resource utilization times for the transportation resources. For instance, the optimal solution can be associated with a largest or maximum load-to-resource utilization time for the transportation resources.

Figure 3:
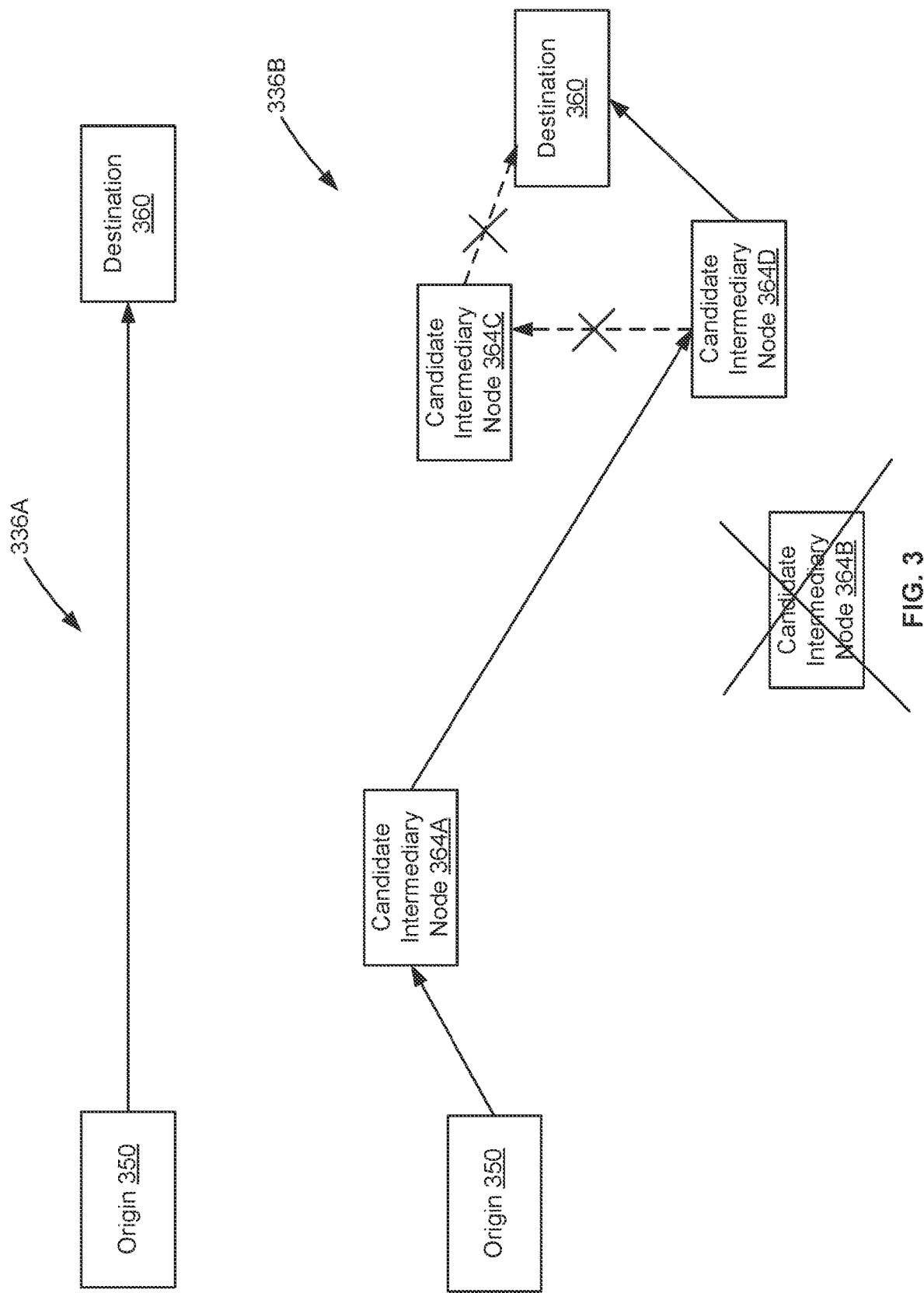
FIG. 3 illustrates candidate network paths for transporting a load according to some embodiments.

FIG. 3 illustrates candidate network paths 336A-B for transporting a load according to some embodiments. A first candidate network path 336A directly connects an origin 350 to a destination 360. A second candidate network path 336B indirectly connects the origin 350 to the destination 360 through intermediary nodes 364. Each intermediary node represents a handoff facility. The network is illustrated as including candidate intermediary nodes 364A-D between the origin 350 and the destination 360.

A computer system (e.g., computer system 130 in FIG. 1) can determine which candidate intermediary nodes 364A-D can be included in the second candidate network path 336B based on constraints. For instance, there may be a constraint indicating a maximum path length. The computer system can determine a first distance length of the first candidate network path 336A and a second distance length of the second candidate network path 336B if the candidate intermediary node 364B is included. Upon determining that a difference between the second distance length and the first distance length exceeds a distance threshold, the computer system can determine that the candidate intermediary node 364B is not to be included in the second candidate network path 336B. In addition, the constraints may indicate a range of acceptable lengths (e.g., time lengths or distance lengths) per segment. Upon determining that a segment connecting the origin 350 to the candidate intermediary node 364B and then to the destination 360 is not within the range of acceptable lengths, the computer system can exclude the candidate intermediary node 364B from the second candidate network path 336B.

Additionally or alternatively, the constraints may indicate a maximum number (e.g., two, three, four, etc.) of intermediary facilities that can be used for a candidate network path. So, if the maximum number is two, the computer system can determine that the second candidate network path 336B can include "M" candidate intermediary nodes 364, where "M" is smaller than the maximum number. For example, the second candidate network path 336B can include candidate intermediary node 364A and candidate intermediary node 364D rather than candidate intermediary node 364A, candidate intermediary node 364D, and candidate intermediary node 364C.

FIG. 4 illustrates example route plans 414A-B generated with and without an optimization model according to some embodiments. Route plan 414A is generated without the optimization model and route plan 414B is generated with the optimization model. The route plan 414A includes three tours, where a tour is a driver starting at a first facility, traveling to one or more additional facilities, and returning to the first facility. Each tour of the route plan 414A is for a different load, so the route plan 414A does not include handoffs. A first tour of the route plan 414 involves a first driver transporting a first load from a Seattle facility to a Portland facility 452. During a second tour, a second load is transported from the Portland facility 452 to a Salt Lake City facility 454. The first driver returns to the Seattle facility 450 with an unloaded vehicle, as illustrated by the dashed line from the Portland facility 452 to the Seattle facility 450. Once the second driver reaches the Salt Lake City facility 454, the second driver completes the second tour by returning to the Portland facility 452 with an unloaded vehicle. A third driver performs a third tour by transporting a third load from the Salt Lake City facility 454, through a Denver facility 456 and a Santa Fe facility 458, before reaching a Phoenix facility 460. The third driver then completes the third tour by returning to the Salt Lake City facility 454 from the Phoenix facility 460 with an unloaded vehicle.

In contrast, the route plan 414B includes two tours with fewer unloaded segments. Both of the tours are for the same load, so the route plan 414B involves handoffs. A first tour involves a first driver transporting the load from the Seattle facility 450 to the Portland facility 452 and then to a Boise facility 462. The first driver completes the first tour by returning to the Seattle facility 450 from the Boise facility 462 with an unloaded vehicle. A second tour then involves a second driver picking up the load at the Boise facility 462, transporting the load to the Salt Lake City facility 454, the Denver facility 456, the Santa Fe facility 458, and then to the Phoenix facility 460. Once the second driver delivers the load to the Phoenix facility 460, the second driver completes the second tour by returning to the Boise facility 462 with an unloaded vehicle. Alternatively, the second driver may transport another load from the Phoenix facility 460 to the Boise facility 462, which may be part of another network path, to complete the second tour. In another example, the second driver may travel to another facility within a distance threshold of the Phoenix facility 460 to pick up the other load and transport the other load to the Boise facility 462.

As illustrated by route plan 414B, using the optimization model can increase network density by artificially breaking each direct network path into multiple candidate network paths (e.g., the Portland to Salt Lake path into a Portland-to-Boise and Boise-to-Salt Lake paths), each with multiple shorter segments. The added optimality results in computational complexity that renders generating the route plan 414B challenging to resolve in a timely manner (e.g., in time for deployment of resources). So, the route plan 414B can be generated in a two-stage approach that first generates candidate network paths per load and then uses the optimization model to select a network path for each load and assigns transportation resources to each segment of the network paths. The transportation resources may be internal or external resources to an entity. As a result, the optimal solution is achieved and the resources are optimally used, which increases the throughput of the network.

Figure 5:
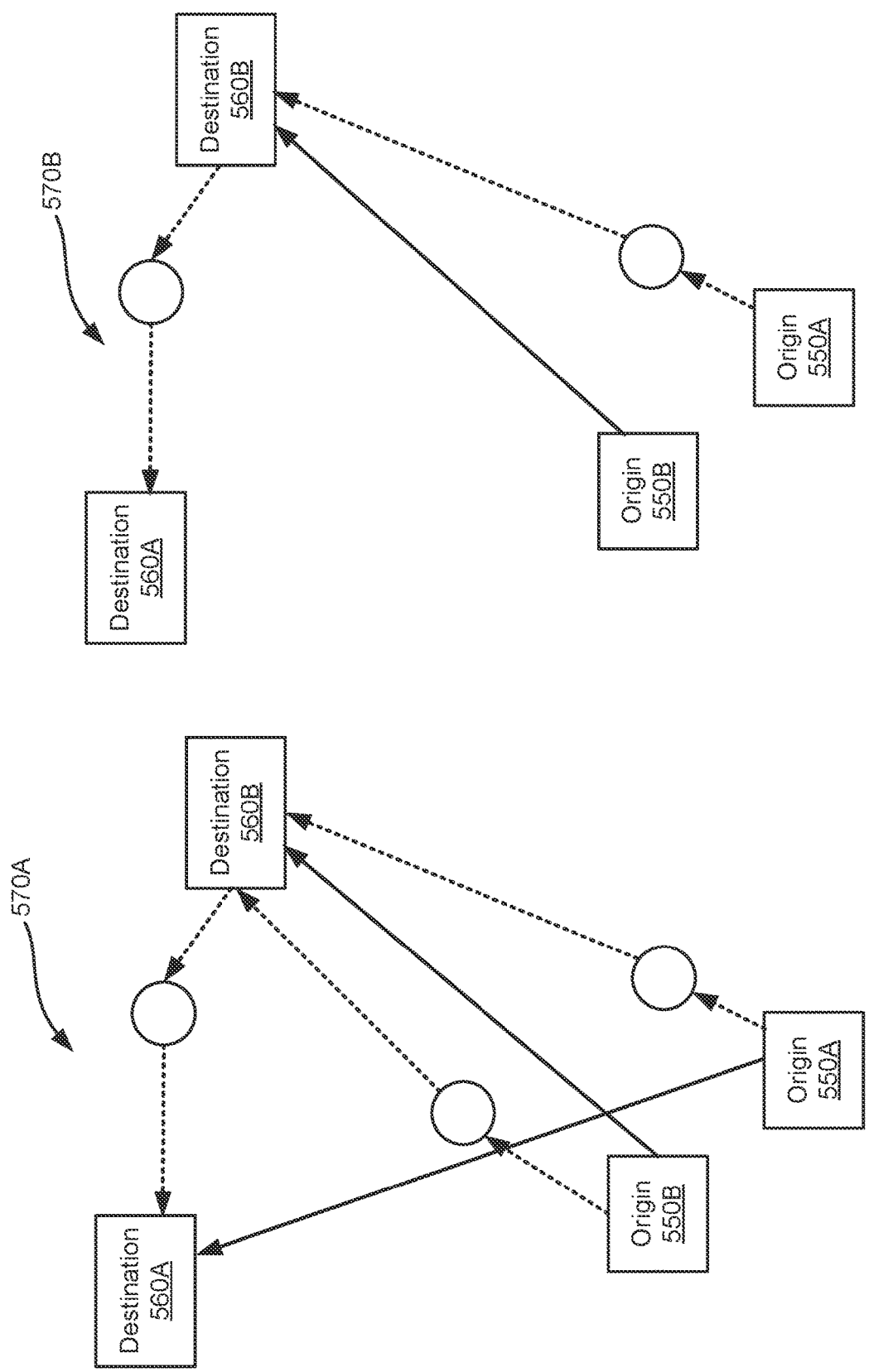
FIG. 5 illustrates an example of selecting network paths for transportation handoffs according to some embodiments.

FIG. 5 illustrates an example of selecting network paths for transportation handoffs according to some embodiments. Network 570A corresponds to a network after candidate network paths between origins 550A-B and destinations 560A-B are generated. For instance, each origin-destination pair includes two candidate network paths. One of the candidate network paths is a direct path between the origin 550 and the corresponding destination 560, whereas the other candidate network path is an indirect path between the origin 550 and the corresponding destination 560 through one or more intermediary nodes. Each candidate network path satisfies constraints, such as a maximum number (e.g., three) of intermediary nodes.

Network 570B corresponds to a network after a single candidate network path is selected for each origin-destination pair. As illustrated, the network path selected between the origin 550A and the destination 560A is the candidate network path that indirectly connects the origin 550A to the destination 560A through three intermediary nodes, one of which is the destination 560B. In addition, the network path selected between the origin 550B and the destination 560B is the candidate network path that directly connects the origin 550B to the destination 560B.

Transportation resources are assigned to each segment of the network 570B. The transportation resources may be internal or external resources. For instance, a first vehicle can be assigned to the segment connecting the origin 550B to the destination 560B. In addition, a second vehicle can be assigned to the segment connecting the origin 550A to the first intermediary node, a third vehicle can be assigned to the segment connecting the first intermediary node to the second intermediary node, a fourth vehicle can be assigned to the segment connecting the second intermediary node to the third intermediary node, and a fifth vehicle can be assigned to the segment connecting the third intermediary node to the destination 560B. Alternatively, a same vehicle may be used for multiple consecutive segments (e.g., the segment connecting the origin 550A to the first intermediary node and the segment connecting the first intermediary node to the second intermediary node or the segment connecting the origin 550B to the destination 560B and the segment connecting the second intermediary node (destination 560B) to the third intermediary node).

Figure 6:
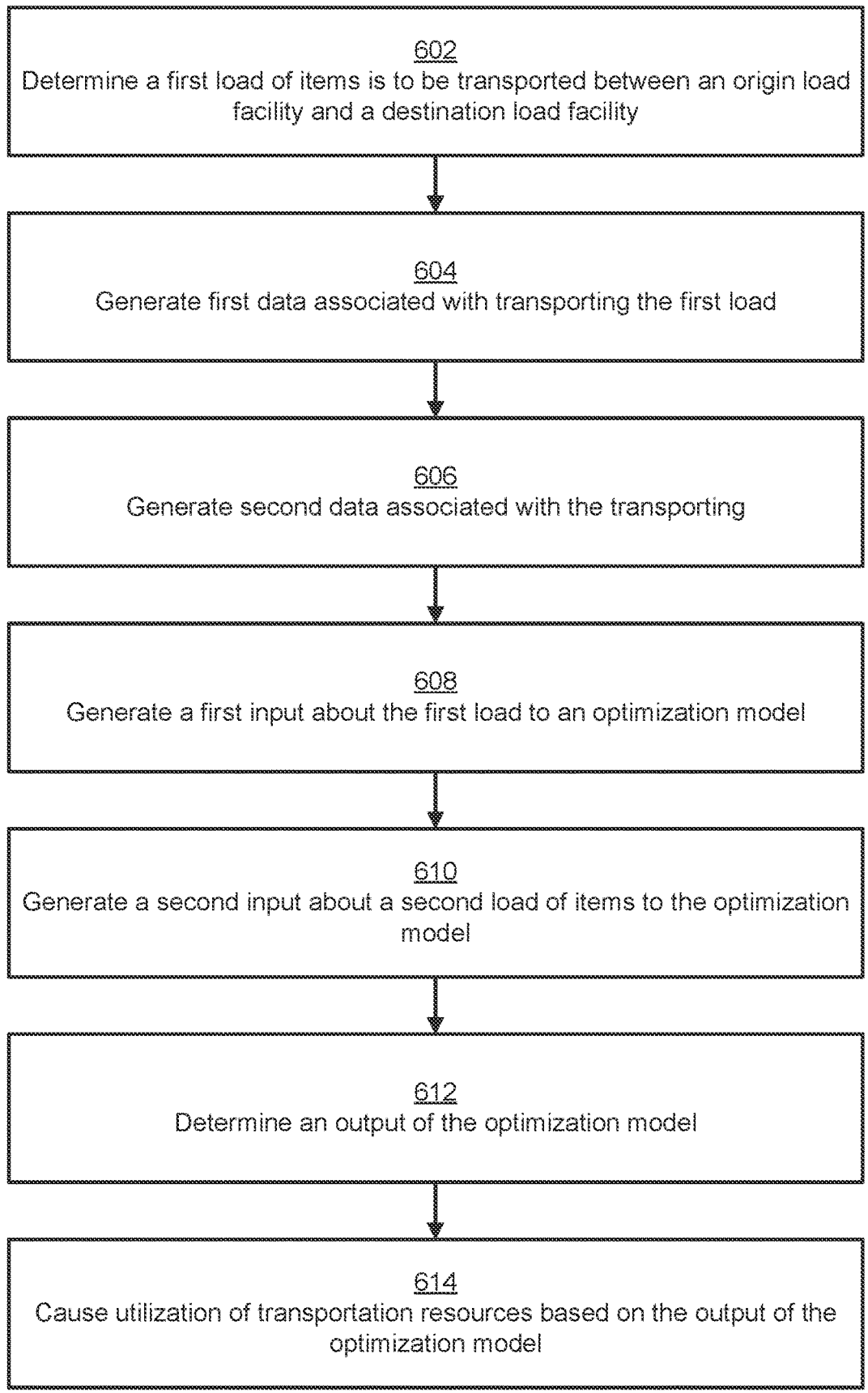
FIG. 6 illustrates an example flow for an overall process of determining transportation handoffs for increased network density according to some embodiments.
Figure 7:
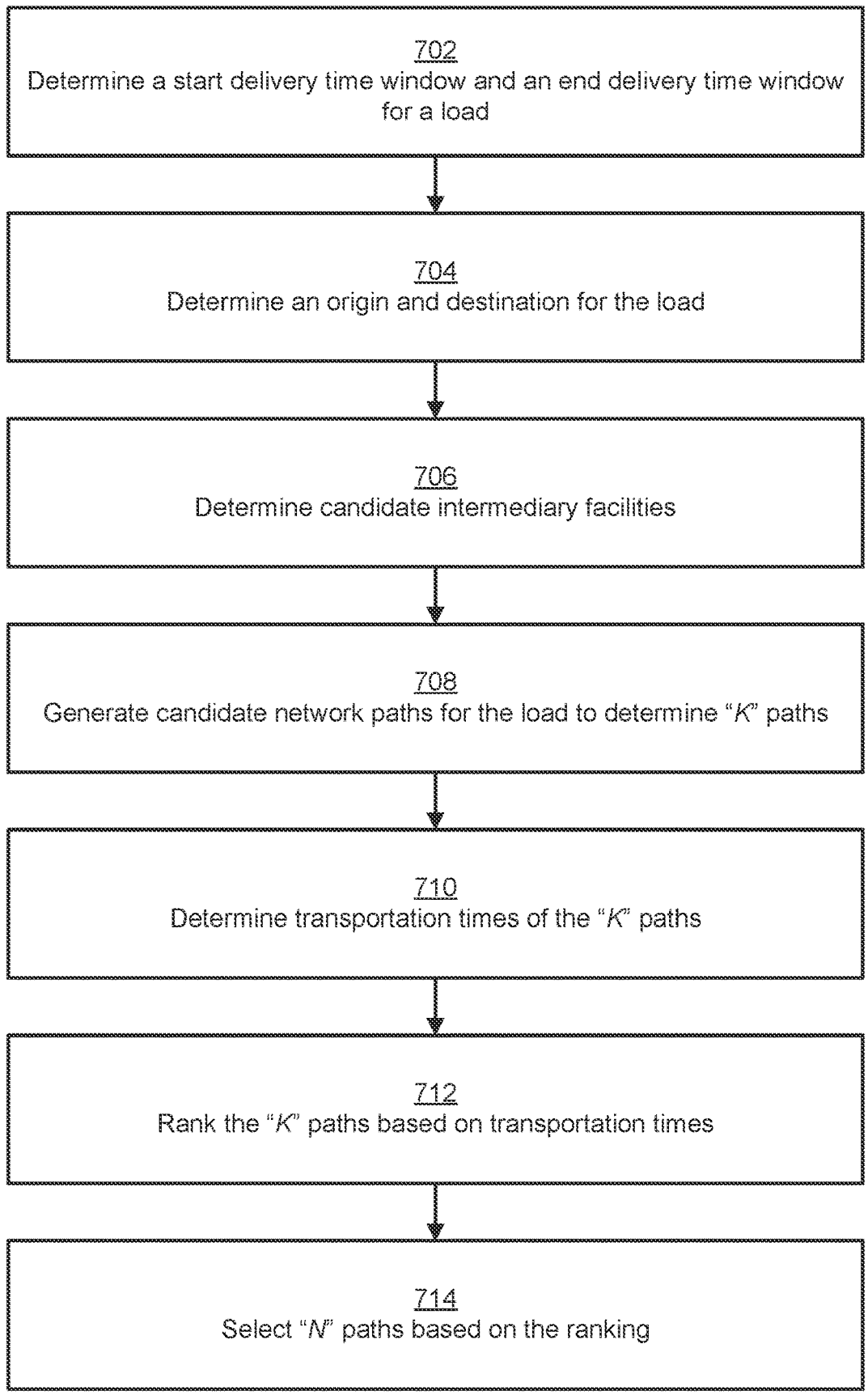
FIG. 7 illustrates an example flow for determining candidate network paths for a load according to some embodiments.
Figure 8:
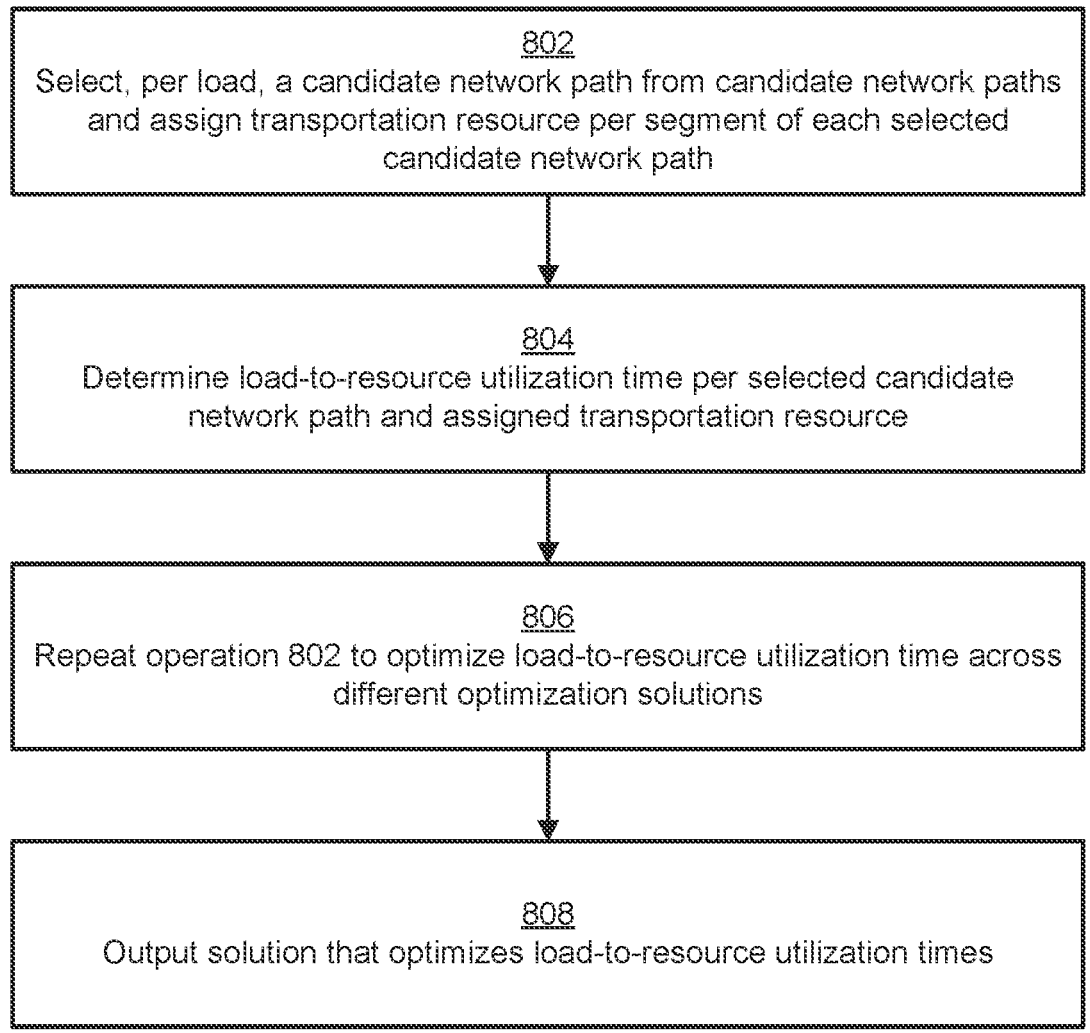
FIG. 8 illustrates an example flow for selecting a candidate network path and assigning transportation resources for loads according to some embodiments.

FIGS. 6-8 illustrate example flows for processes associated with transportation handoffs. Operations of the flows can be performed by a computer system, such as the computer system 130. Some or all of the instructions for performing the operations can be implemented as hardware circuitry and/or stored as computer-readable instructions on a non-transitory computer-readable medium of the computer system. As implemented, the instructions represent modules that include circuitry or code executable by processor(s) of the computer system. The use of such instructions configures the computer system to perform the specific operations described herein. Each circuitry or code in combination with the relevant processor(s) represent a means for performing a respective operation(s). While the operations are illustrated in a particular order, it should be understood that no particular order is necessary and that one or more operations may be omitted, skipped, performed in parallel, and/or reordered.

FIG. 6 illustrates an example flow for an overall process of determining transportation handoffs for increased network density according to some embodiments. In an example, the flow includes operation 602 where the computer system determines a first load of items is to be transported between an origin load facility and a destination load facility. The origin load facility and the destination load facility are part of a network of load facilities and segments connecting load facilities.

In an example, the flow includes operation 604 where the computer system generates first data associated with transporting the first load. The first data indicates a first candidate network path within the network that directly connects the origin load facility and the destination load facility. So, the first candidate network path includes a single segment.

In an example, the flow includes operation 606 where the computer system generates second data associated with the transporting. The second data indicates a second candidate network path within the network that indirectly connects the origin load facility and the destination load facility. Accordingly, the second candidate network path includes a number of intermediary facilities of the network, a first segment that connects the origin load facility to an intermediary load facility, and a second segment that connects the intermediary load facility to another intermediary load facility or to the destination load facility.

In an example, the flow includes operation 608 where the computer system generates a first input about the first load to an optimization model. The first input includes the first data and the second data. The first input may additionally include additional data of additional candidate network paths associated with the transporting.

In an example, the flow includes operation 610 where the computer system generates a second input about a second load of items to the optimization model. The second input indicates, for the second load, a plurality of candidate network paths associated with transporting the second load within the network. For instance, the candidate network paths can include a direct path between an origin and a destination of the second load and indirect paths between the origin and the destination of the second load.

In an example, the flow includes operation 612 where the computer system determines an output of the optimization model. The output indicates that the second candidate network path is selected for the first load, the first segment is assigned to a first transportation resource, and the second segment is assigned to a second transportation resource. Each of the first transportation resource or the second transportation resource may be an internal or an external transportation resource. The optimization model determines, per load and based at least in part on inputs about multiple loads, that a selected network path from corresponding candidate network paths and a transportation resource assignment per segment of the selected network path increases a load-to-resource utilization time of the load.

In an example, the flow includes operation 614 where the computer system causes utilization of transportation resources based on the output of the optimization model. The computer system can output an indication that the first transportation resource is assigned to the first segment and the second transportation resource is assigned to the second segment. The indication can cause the transportation resources to be deployed according to the assignments.

FIG. 7 illustrates an example flow for determining candidate network paths for a load according to some embodiments. In an example, the flow includes operation 702 where the computer system determines a start delivery time window and an end delivery time window for a load. The start delivery time window is a time window in which the load is to leave an origin and the end delivery time window is a time window in which the load is to arrive at a destination.

In an example, the flow includes operation 704 where the computer system determines an origin and a destination for the load. The computer system can receive load data indicating the origin and the destination for the load. The origin and the destination can be load facilities of a network.

In an example, the flow includes operation 706 where the computer system determines candidate intermediary facilities. The candidate intermediary facilities may be subject to one or more constraints. For instance, the candidate intermediary facilities may be constrained to be within a length range (e.g., time length or distance length) from the origin, the destination, and/or another intermediary facility.

In an example, the flow includes operation 708 where the computer system determines candidate network paths for the load to determine "K" paths. The candidate network paths are direct or indirect paths connecting the origin to the destination. The candidate network paths may be subject to one or more additional constraints associated with the origin, the destination, network path length, or segment length. For instance, the constraints may indicate a maximum number of handoffs, a distance threshold for a maximum distance length relative to a direct network path between the origin and the destination, a range of lengths per segment of the candidate network paths, and/or range of distances between an intermediary facility and the origin or the destination. In addition, the constraints may indicate a range of time window differences between a dwelling time window (e.g., an amount of time to handoff the load between transportation resources) at an intermediary facility and the start delivery time window or the dwelling time window and the end delivery time window, and upon determining that a time window difference for the load is within the range, the computer system can include the candidate network path in the "K" paths. Additionally or alternatively, the constraints may indicate a range of operational time windows for using segments to transport the load. The operational time windows may relate to operational hours of a facility (e.g., origin, destination, intermediary facility) and/or regulated times for transporting loads. Upon determining that an operational time window for using a segment to transport the load is within the range, the computer system can include the candidate network path with the segment in the "K" paths.

In an example, the flow includes operation 710 where the computer system determines transportation times for the "K" paths. The transportation time is a time involved in transporting the load using a particular candidate network path of the "K" paths. The transportation time can account for the dwelling time window for handing off the load at each intermediary facility.

In an example, the flow includes operation 712 where the computer system ranks the "K" paths based on their transportation times. Candidate network paths that have longer transportation times may be ranked lower than candidate network paths that have shorter transportation times. So the candidate network path with the shortest transportation time may be ranked first, the candidate network path with the next shorted transportation time may be ranked second, and so on.

In an example, the flow includes operation 714 where the computer system selects "K" paths based on the ranking. The "K" paths can be a subset of the "K" paths. For instance, the subset can include the "K" highest ranked paths (e.g., the "K" shortest transportation times).

As a particular example, the computer system may generate candidate network paths other than a direct network path between the origin and the destination for any origin-destination pair with a transportation time of at least three hours. In addition, the computer system may generate candidate network paths where a transportation time of each segment is greater than 30% of the transportation time of the direct network path (or ninety minutes) and less than 11.5 hours for a single driver or 59.5 hours for a team of drivers. The computer system may also generate candidate network paths with a maximum allowable increase in total transportation time of 50% compared to the direct network path. The computer system selects the "K" shortest candidate network paths for each origin-destination pair, so there is no limitation on the number of segments generated for each candidate network path. A graph $G=(V, E)$ can be constructed, where V represents all vertices which are origin-destination pairs with more than three hours transportation time and intermediary locations. There is an arc between each two vertices if their corresponding transportation time is less than or equal to a maximum transportation time defined for that instance and also their minimum transportation time is greater than or equal to ninety minutes. The arc set is represented 99 by E. A shortest path function is used to find the first "K" shortest candidate network paths for each origin-destination pair. The generated candidate network paths are further pruned for each origin-destination pair based on total transportation time of the generated candidate network paths to exclude those that are longer than the direct network path by a particular threshold (e.g., 50%).

FIG. 8 illustrates an example flow for selecting a candidate network path and assigning transportation resources for loads according to some embodiments. In an example, the flow includes operation 802 where the computer system selects, per load, a candidate network path from candidate network paths and assigns transportation resources per segment of each selected candidate network path. Each candidate network path can be a path for transporting a load of items from an origin to a destination. The computer system can select the candidate network path as a first possible solution of an optimization model. The transportation resources are internal or external to the network. The computer system assigns the transportation resources as part of the first possible solution. The first possible solution indicates the first segments and the selected candidate network paths.

In an example, the flow includes operation 804 where the computer system determines a load-to-resource utilization time per selected candidate network path and assigned transportation resource. The load-to-resource utilization time is associated with the first possible solution of the optimization model. The load-to-resource utilization time indicates an amount of time the transportation resource is loaded compared to an amount of time the transportation resource is unloaded.

In an example, the flow includes operation 806 where the computer system repeats operation 802 to optimize the load-to-resource utilization time across different optimization solutions. The computer system can assign a different transportation resource to at least one segment of the selected candidate network paths and/or can select, per load, a different candidate network path of the candidate network paths. The different transportation resource and/or the different candidate network path can be selected to improve the load-to-resource utilization time.

In an example, the flow includes operation 808 where the computer system outputs the solution that optimizes the load-to-resource utilization times. The computer system can determine, per load, the candidate network path and the assigned transportation resources per segment that optimize the load-to-resource utilization time. The computer system can output the candidate network path per load and the assigned transportation resources per segment as the optimal solution.

As a particular example, an optimization model can take as input a set of original loads O along with generated candidate network paths for the loads. The optimization model selects an optimal candidate network path for each load as well as an optimal transportation resource for each segment of the selected candidate network path. As such, some segments may be assigned to external transportation resources. Each one of the loads o∈O is associated with a set of candidate network paths $T_o$. Each candidate network path t∈$T_o$ corresponds to a possible way of fulfilling original load o—only one candidate network path is chosen for every original load. The candidate network path t itself consists of segments (set $S_t$). Segments are transportation movements of a particular transportation resource from an origin to a destination. If a candidate network path is selected, all of the segments corresponding to that candidate network path must be fulfilled. If an original load only has one candidate network path and that candidate network path has only one segment—the candidate network path is a direct unsplit route from origin to destination. Other candidate network paths contain two or more segments—each candidate network path corresponds to a different way to split the original load. Segments can be fulfilled by either placing them with an internal transportation resource or by sending them for external fulfillment.

The optimization model also receives a set of blocks B, where each block b∈B corresponds to a driver time for a single driver. A tour can be assigned to every block, where a tour is a sequence of transportation movements that the driver of the block is assigned to execute. Here, the transportation movements are segments. Not all segments of a candidate network path must be executed by the same tour. In addition, segments from different original loads and from different candidate network paths can be combined together in the same tour.

In addition to the set of original loads O, the set of candidate network paths $T_o$ for an original load, the set of all candidate network paths T, the set of segments $S_t$ of a candidate network path, the set of all segments S, and the set of blocks B, the optimization model involves a set of routes $R_b$ for block b∈B, a set of all routes R, and a set of routes $R_s$ that include segment s∈S. The optimization model involves a parameter of a cost $C_s$ of sending segment s∈S to an external transportation resource. The optimization model also includes decision variables $x_r$, $z_t$, and $y_s$, in which $x_r$ is one if route r∈R is selected and zero otherwise, $z_t$ is one if candidate network path t∈T is selected and zero otherwise, and $y_s$ is one if segment s∈S is sent to an external transportation resource and zero otherwise. So, the optimization model can be formulated as:

$$\min \sum_{r \in R} 0 \times x_r + \sum_{s \in S} C_s y_s$$

$$\sum_{r \in R} x_r + y_s \geq z_t \ \forall s \in S_t, \forall t \in T \quad (1)$$

$$\sum_{t \in T_o} z_t = 1 \ \forall o \in O \quad (2)$$

$$\sum_{r \in R_b} x_r \leq 1 \ \forall b \in B \quad (3)$$

$$x_r \in \{0, 1\} \ \forall r \in R$$

$$z_t \in \{0, 1\} \ \forall t \in T$$

$$y_s \in \{0, 1\} \ \forall s \in S$$

With the formulation above, there are two choices to cover each segment s∈S: either by including it in a block of an internal transportation resource, or by sending it to an external transportation resource. The first alternative comes at no cost, while the second alternative costs $C_s$ for segment s∈S. This explains the objective of the optimization problem. But, only segments of the candidate network paths that are chosen needs to be covered, which is depicted in Eqn. (1): If candidate network path t∈T is selected ($z_t$=one), then all the segments s∈$S_t$ of that candidate network path need to be covered. A segment can be covered either by sending it to an external transportation resource ($y_s$=one) or by including it in a tour ($\sum_{r \in R_s} x_r \geq 1$). Eqn. (2) stipulates that exactly one candidate network path has to be selected for each original load. Finally, Eqn. (3) ensures that at most one route can be assigned to every block.

Figure 9:
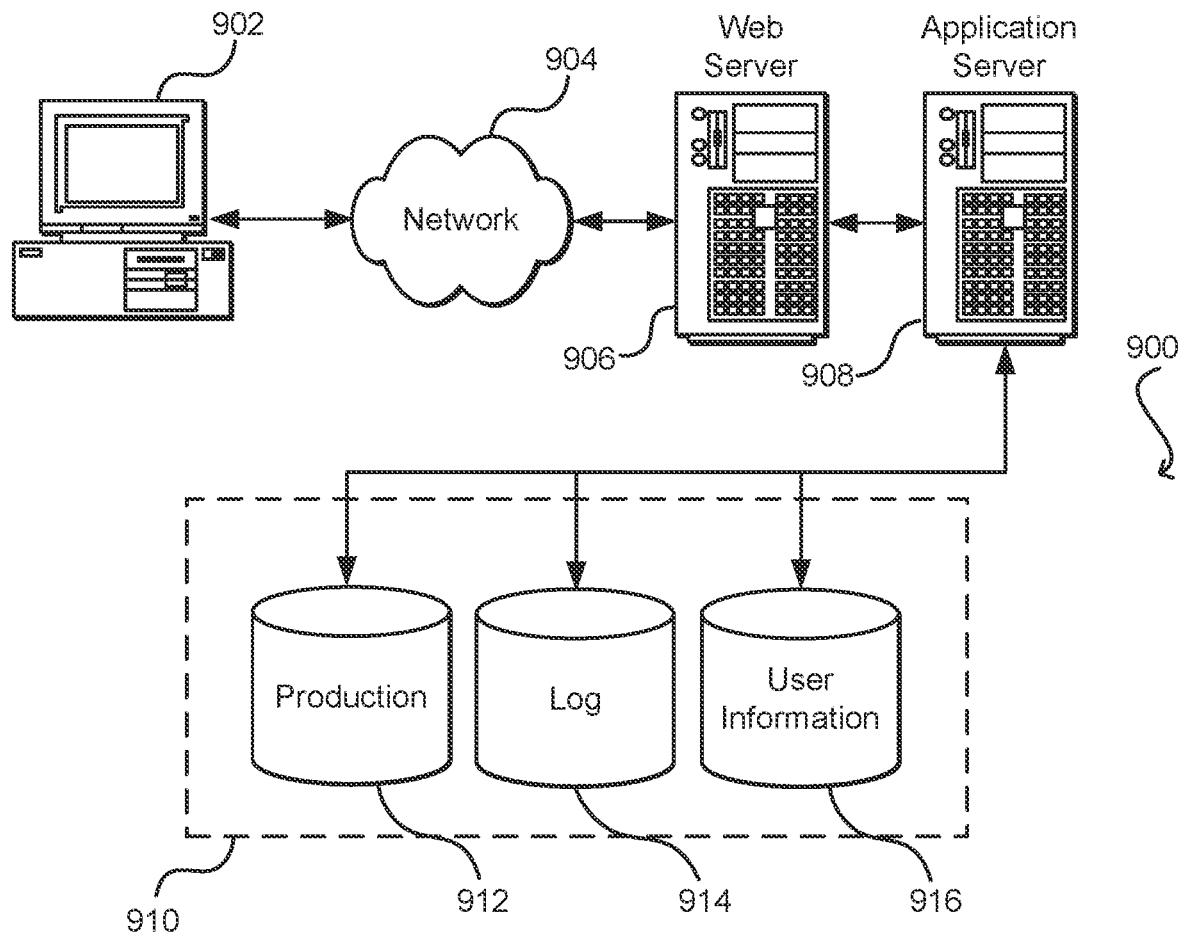
FIG. 9 illustrates an environment in which various embodiments can be implemented.

FIG. 9 illustrates aspects of an example environment 900 for implementing aspects in accordance with various embodiments. As will be appreciated, although a Web-based environment is used for purposes of explanation, different environments may be used, as appropriate, to implement various embodiments. The environment includes an electronic client device 902, which can include any appropriate device operable to send and receive requests, messages, or information over an appropriate network 904 and convey information back to a user of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a Web server 906 for receiving requests and serving content in response thereto, although for other networks an alternative device serving a similar purpose could be used as would be apparent to one of ordinary skill in the art.

The illustrative environment includes at least one application server 908 and a data store 910. It should be understood that there can be several application servers, layers, or other elements, processes, or components, which may be chained or otherwise configured, which can interact to perform tasks such as obtaining data from an appropriate data store. As used herein the term "data store" refers to any device or combination of devices capable of storing, accessing, and retrieving data, which may include any combination and number of data servers, databases, data storage devices, and data storage media, in any standard, distributed, or clustered environment. The application server can include any appropriate hardware and software for integrating with the data store as needed to execute aspects of one or more applications for the client device, handling a majority of the data access and business logic for an application. The application server provides access control services in cooperation with the data store and is able to generate content such as text, graphics, audio, and/or video to be transferred to the user, which may be served to the user by the Web server in the form of HyperText Markup Language ("HTML"), Extensible Markup Language ("XML"), or another appropriate structured language in this example. The handling of all requests and responses, as well as the delivery of content between the client device 902 and the application server 908, can be handled by the Web server. It should be understood that the Web and application servers are not required and are merely example components, as structured code discussed herein can be executed on any appropriate device or host machine as discussed elsewhere herein.

The data store 910 can include several separate data tables, databases or other data storage mechanisms and media for storing data relating to a particular aspect. For example, the data store illustrated includes mechanisms for storing production data 912 and user information 916, which can be used to serve content for the production side. The data store also is shown to include a mechanism for storing log data 914, which can be used for reporting, analysis, or other such purposes. It should be understood that there can be many other aspects that may need to be stored in the data store, such as for page image information and to access right information, which can be stored in any of the above listed mechanisms as appropriate or in additional mechanisms in the data store 910. The data store 910 is operable, through logic associated therewith, to receive instructions from the application server 908 and obtain, update or otherwise process data in response thereto. In one example, a user might submit a search request for a certain type of item. In this case, the data store might access the user information to verify the identity of the user and can access the catalog detail information to obtain information about items of that type. The information then can be returned to the user, such as in a results listing on a Web page that the user is able to view via a browser on the user device 902. Information for a particular item of interest can be viewed in a dedicated page or window of the browser.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 9. Thus, the depiction of the system 900 in FIG. 9 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Most embodiments utilize at least one network that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS"), and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including Hypertext Transfer Protocol ("HTTP") servers, FTP servers, Common Gateway Interface ("CGI") servers, data servers, Java servers, and business application servers. The server(s) also may be capable of executing programs or scripts in response to requests from user devices, such as by executing one or more Web applications that may be implemented as one or more scripts or programs written in any programming language, such as Java©, C, C#, or C++, or any scripting language, such as Perl, Python, or TCL, as well as combinations thereof. The server(s) may also include database servers, including without limitation those commercially available from Oracle©, Microsoft*, Sybase*, and IBM©.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Computer-readable storage media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory ("EEPROM"), flash memory or other memory technology, Compact Disc Read-Only Memory ("CD-ROM"), digital versatile disk (DVD), or other optical storage, magnetic cassettes, magnetic tape, magnetic disk storage, or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A system comprising:
a network of load facilities and segments connecting the load facilities;
a plurality of transportation resources; and
a computer system comprising one or more processors and one or more memory storing instructions that, upon execution by the one or more processors, configure the computer system to:
determine that a first load of items is to be transported between an origin load facility and a destination load facility within the network;
generate first data associated with transporting the first load between the origin load facility and the destination load facility, the first data indicating a first candidate network path within the network, the first candidate network path directly connecting the origin load facility and the destination load facility;
generate second data associated with the transporting, the second data indicating a second candidate network path within the network, the second candidate network path indirectly connecting the origin load facility and the destination load facility by including (i) a number of intermediary facilities of the network, (ii) a first segment that connects the origin load facility to an intermediary load facility, and (iii) a second segment that connects the intermediary load facility to another intermediary load facility or to the destination load facility;
generate a first input about the first load to an optimization model, the first input including the first data and the second data;
generate a second input about a second load of items to the optimization model, the second input indicating, for the second load, a plurality of candidate network paths associated with transporting the second load within the network;
determine an output of the optimization model by at least using the first input, the second input, a capability of changing transportation resource assignments between segments, and constraints on a handover between two transportation resources corresponding to a transportation resource assignment change, the output indicating that (iv) the second candidate network path is selected for the first load, (v) the first segment is assigned to a first transportation resource of the plurality of transportation resources, and (vi) the second segment is assigned to a second transportation resource of the plurality of transportation resources, the optimization model configured to determine, per load and based at least in part on inputs about a plurality of loads, that a selected network path from corresponding candidate network paths and a transportation resource assignment per segment of the selected network path increases a load-to-resource utilization time of the load; and
control, based at least in part on the output of the optimization model, utilization of the plurality of transportation resources.

2. The system of claim 1, wherein the one or more memory store additional instructions that, upon execution by the one or more processors, configure the computer system to:
determine a start delivery time window of the first load at the origin load facility;
determine an end delivery time window of the first load at the destination load facility;
determine a dwelling time window at the intermediary load facility, the dwelling time window associated with handing off the first load between transportation resources;
determine a set of constraints associated with at least one of: the origin load facility, the destination load facility, the intermediary load facility, a candidate network path distance length, or a segment transportation time; and
determine "K" candidate network paths associated with the transporting of the first load based at least in part on the start delivery time window, the end delivery time window, the dwelling time window, and the set of constraints.

3. The system of claim 2, wherein the one or more memory store further instructions that, upon execution by the one or more processors, configure the computer system to:
determine a transportation time per candidate network path of the "K" candidate network paths;
rank the "K" candidate network paths based at least in part on corresponding transportation times; and
determine a subset "N" candidate network paths of the "K" candidate network paths based at least in part on the ranking, wherein the first input indicates the "N" candidate network paths.

4. The system of claim 1, wherein the output of the optimization model further indicates a third network path selected in association with the transporting of the second load and that the first transportation resource is assigned to a third network segment of the third network path, wherein the third network segment starts at the intermediary load facility.

5. A computer-implemented method, comprising:
generating first data associated with transporting a first load of items between an origin and a destination within a network, the first data indicating a first candidate network path within the network, the first candidate network path directly connecting the origin and the destination;
generating second data associated with the transporting, the second data indicating a second candidate network path within the network, the second candidate network path indirectly connecting the origin and the destination;
generating a first input about the first load to an optimization model, the first input including the first data and the second data;
generating a second input about a second load of items to the optimization model, the second input indicating, for the second load, a plurality of candidate network paths associated with transporting the second load within the network;
determining an output of the optimization model by at least using the first input, the second input, a capability of changing one or more resource assignment between segments, and a constraint associated with a handover between two transportation resources corresponding to a resource assignment change, the output indicating, for the first load, a selected network path from the first candidate network path and the second candidate network path and a resource assignment per segment of the selected network path, the optimization model configured to determine the selected network path and the resource assignment based at least in part on the first input, the second input, the capability, and the constraint; and controlling, based at least in part on the output of the optimization model, utilization of a plurality of transportation resources.

6. The computer-implemented method of claim 5 further comprising:

determining, based at least in part on the output, that (i) the second candidate network path is selected for the first load, (ii) a first segment of the second candidate network path is assigned to a first transportation resource of a plurality of resources of the network, and (iii) a second segment of the second candidate network path assigned to a second transportation resource of the plurality of resources, wherein the first segment connects the origin to an intermediary facility of the network, wherein the second segment connects the intermediary facility to another intermediary facility of the network or to the destination, and wherein the optimization model is configured to determine, per load and based at least in part on inputs about a plurality of loads, that one of the corresponding candidate network paths and a transportation resource assignment per segment increases a load-to-resource utilization time of the load.

7. The computer-implemented method of claim 5 further comprising:

determining "K" candidate network paths associated with the transporting of the first load based at least in part on a start delivery window, an end delivery window, and a set of constraints associated with at least one of the origin, the destination, network path length, or segment length.

8. The computer-implemented method of claim 7 further comprising:

determining that the second candidate network path includes "M" intermediary facilities of the network; and determining that "M" is smaller than a maximum number of intermediary facilities, wherein the set of constraints indicates the maximum number.

9. The computer-implemented method of claim 7 further comprising:

determining a first distance length of the first candidate network path;

determining a second distance length of the second candidate network path; and determining that a difference between the second distance length and the first distance length is within a distance threshold, wherein the set of constraints indicates the distance threshold.

10. The computer-implemented method of claim 7 further comprising:

determining a length per segment of the second candidate network path, wherein a length of a segment includes at least one of: a time length or a distance length; and determining that the length is within a range of lengths, wherein the set of constraints indicates the range.

11. The computer-implemented method of claim 7 further comprising:

determining that the second network candidate path includes an intermediary facility;

determining a distance between the intermediary facility and the origin or the destination; and determining that the distance within a range of distances, wherein the set of constraints indicates the range.

12. The computer-implemented method of claim 7 further comprising:

determining a start delivery time window corresponding to a start of the transporting of the first load from the origin;

determining an end delivery time window corresponding to an end of the transporting of the first load at the destination;

determining that the second candidate network path includes an intermediary facility;

determining a dwelling time window at the intermediary facility;

determining a time window difference between at least the dwelling time window and the start delivery time window or the dwelling time window and the end delivery time window; and determining that the time window difference is within a range of time window differences, wherein the set of constraints indicates the range.

13. The computer-implemented method of claim 7 further comprising:

determining that the second candidate network path includes a segment between the origin and a first intermediary facility or between a second intermediary facility and the destination, wherein the second intermediary facility is the same as or different from the first intermediary facility;

determining an operational time window associated with using the segment to transport the first load; and determining that the operational time window is within a range of operational time windows, wherein the set of constraint indicates the range.

14. The computer-implemented method of claim 5 further comprising:

determining "K" candidate network paths associated with the transporting of the first load between the origin and the destination;

determining, per candidate network path of the "K" candidate network paths, a transportation time associated with using the candidate network path to first load between the origin and the destination;

ranking the "K" candidate network paths based at least in part on corresponding transportation times; and determining a subset "N" candidate network paths of the "K" candidate network paths based at least in part on the ranking, wherein the first input indicates the "N" candidate network paths.

15. One or more non-transitory computer-readable storage media storing instructions that, upon execution on a computer system, cause the computer system to perform operations comprising:

determining that a first load of items is to be transported between an origin and a destination within a network;

generating first data associated with transporting the first load between the origin and the destination, the first data indicating a first candidate network path within the network, the first candidate network path directly connecting the origin and the destination;

generating second data associated with the transporting, the second data indicating a second candidate network path within the network, the second candidate network path indirectly connecting the origin and the destination;

generating a first input about the first load to an optimization model, the first input including the first data and the second data;

generating a second input about a second load of items to the optimization model, the second input indicating, for the second load, a plurality of candidate network paths associated with transporting the second load within the network;

determining an output of the optimization model by at least using the first input, the second input, a capability of changing one or more resource assignment between segments, and a constraint associated with a handover between two transportation resources corresponding to a resource assignment change, the output indicating, for the first load, a selected network path from the first candidate network path and the second candidate network path and a resource assignment per segment of the selected network path, the optimization model configured to determine the selected network path and the resource assignment based at least in part on the first input, the second input, the capability, and the constraint; and controlling, based at least in part on the output of the optimization model, utilization of a plurality of transportation resources.

16. The one or more non-transitory computer-readable storage media of claim 15 storing additional instructions that, upon execution on the computer system, cause the computer system to perform additional operations comprising:

selecting, as part of a first possible solution of the optimization model, a single network path per load, wherein the first possible solution indicates the first candidate network path; and selecting, as part of a second possible solution of the optimization model, a same or a different single network path per load, wherein the second possible solution indicates the second candidate network path.

17. The one or more non-transitory computer-readable storage media of claim 16 storing further instructions that, upon execution on the computer system, cause the computer system to perform further operations comprising:

assigning, as part of the first possible solution, first transportation resources to first segments of selected first network paths, wherein the first possible solution indicates the first segments and the selected first network paths, and wherein the first transportation resources are internal and external to the network; and assigning, as part of the second possible solution, second transportation resources to second segments of selected second network paths, wherein the second possible solution indicates the second segments and the selected second network paths, and wherein the second transportation resources are internal and external to the network.

18. The one or more non-transitory computer-readable storage media of claim 15 storing additional instructions that, upon execution on the computer system, cause the computer system to perform additional operations comprising:

determining, per possible solution of the optimization model, a network path per load, a transportation resource-to-segment assignment per network path, and a load-to-resource utilization time per transportation resource.

19. The one or more non-transitory computer-readable storage media of claim 18 storing further instructions that, upon execution on the computer system, cause the computer system to perform further operations comprising:

determining an optimal solution from possible solutions of the optimization model based at least in part on load-to-resource utilization times corresponding to transportation resources.

20. The one or more non-transitory computer-readable storage media of claim 15, wherein the output of the optimization model further indicates:

the second candidate network path is selected for the transporting of the first load, a third candidate network path is selected for the transporting of the second load, a transportation vehicle is assigned to transport the first load along a first segment of the second candidate network path and along a second segment of the third candidate network path, the first segment has a start associated with a domicile of the transportation vehicle, the second segment has an end associated with the domicile of the transportation vehicle, the first segment and the second segment share a facility, or a first facility where the first segment ends is within a distance threshold to a second facility where the second segment starts.

* * * * *